United States Patent

[11] 3,616,112

| [72] | Inventor | Ramesh R. Desai<br>New Providence, N.J. |
|---|---|---|
| [21] | Appl. No. | 854,076 |
| [22] | Filed | Aug. 29, 1969 |
| [45] | Patented | Oct. 26, 1971 |
| [73] | Assignee | Balsa Development Corporation<br>New York, N.Y. |

[54] A BALSA WOOD CORE IN A LAMINATED STRUCTURAL SANDWICH
6 Claims, 4 Drawing Figs.

[52] U.S. Cl. .................................................. 161/37,
9/3, 156/279, 156/300, 161/39, 161/43, 161/89, 161/159
[51] Int. Cl. ............................................. B32b 3/18
[50] Field of Search .......................................... 161/37-39, 43, 93, 89, 159; 156/279, 300; 9/1, 3

[56] References Cited
UNITED STATES PATENTS

| 3,139,371 | 6/1964 | Sisko ............................ | 161/37 |
| 3,376,185 | 4/1968 | Shook et al. .................. | 161/37 |
| 3,214,319 | 10/1965 | Graham ....................... | 161/68 |
| 3,194,707 | 7/1965 | McNae ......................... | 156/247 |

Primary Examiner—Philip Dier
Attorney—Michael Ebert

ABSTRACT: A tessellated contour core blanket for use in structural laminates, the blanket being constituted by an array of blocks, preferably of end-grain balsa, adhesively secured to an open mesh scrim, the exposed ends of the blocks being sealed to prevent the admission therein of moisture or resin, whereby the blanket may be stored for prolonged periods without blanket warpage, and the blanket may thereafter be laminated to facing skins without printout effects.

PATENTED OCT 26 1971　　　　　　　　　3,616,112
Fig.1.
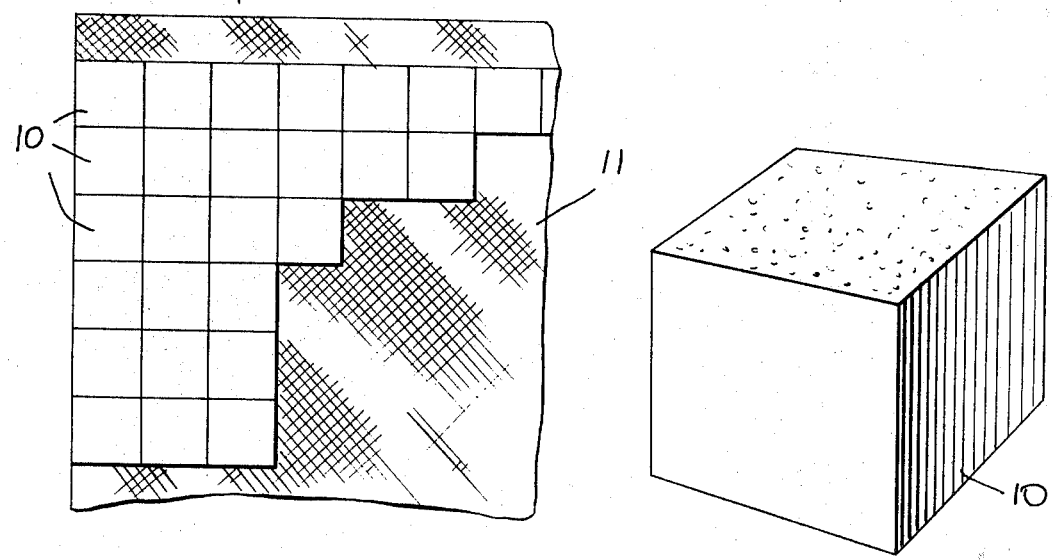
Fig.2.
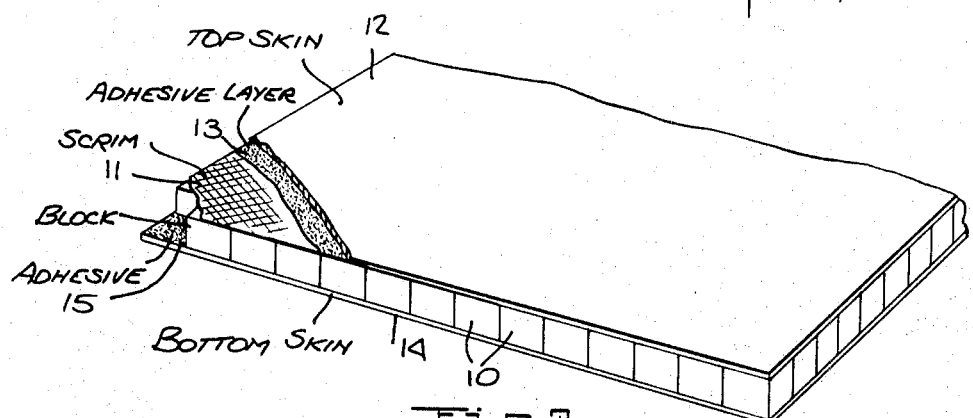
Fig.3.
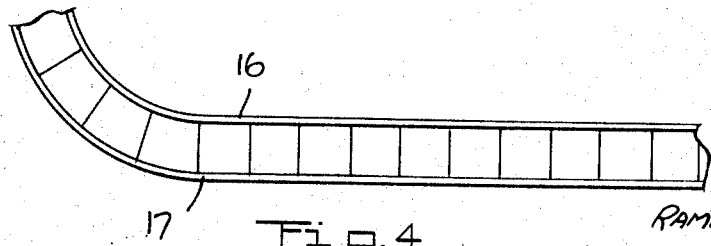
Fig.4.
INVENTOR.
RAMESH R. DASAI
BY Michael Ebert
ATTORNEY

A BALSA WOOD CORE IN A LAMINATED STRUCTURAL SANDWICH

BACKGROUND OF THE INVENTION

This invention relates generally to lightweight, high-strength cores for laminated structures, and more particularly to a tessellated core blanket formed of end-grain balsa blocks attached to a flexible scrim.

Structural sandwich laminates are fabricated by bonding thin facings or skins of high tensile and compressive strength to lightweight core materials. The main function of the bonded core material in the sandwich is to stabilize and stiffen the thin facings so that the major part of the load is borne thereby. The bonded core also converts the two skins into a unitary structure of great rigidity, so that they deform much less under load than they would unjoined.

It is known that laminates of high strength-to-weight ratio can be realized by combining the superior properties of end-grain balsa cores with the required facing material. End-grain balsa of good quality has a uniformly high compressive strength as well as a high modulus of rigidity and elasticity. Such balsa core sandwich laminates, in addition to their excellent mechanical properties and dimensional stability, also afford highly effective thermal insulation. Moreover, where the sandwich undergoes cyclic flexure, shock and vibration, it will be found that a balsa core is less subject to fatigue than other core materials.

End-grain balsa-cored sandwich laminates have been widely used in transportation and handling equipment, such as for floors of railroad cars, shipping containers, cargo pallets, bulkheads, doors, reefer bodies, and in a wide variety of other applications. These laminates have also been employed for structural insulation in aircraft applications, housing and in boating.

Where the structure to be reinforced is constituted by planar surfaces, the balsa core may be simply a solid slab of material laminated to the facings. But in the case of hulls and other structures having single or double curvatures, or other complex contours, it is ordinarily not possible to conform the solid balsa to the contour without bending the balsa slab, and this involves difficult, time-consuming and expensive techniques.

In recent years, balsa blankets have been developed composed of individual balsa blocks which are attached to a common carrier, such as a fabric scrim, whereby the blanket may readily be conformed to a curved surface for lamination thereto. Such blankets are useful in the construction of reinforced plastic boats and larger vessels, for they lend themselves to lamination between layers of reinforced fiber glass or other plastic material, thereby bringing about a distribution of weight favorable to high stability and buoyancy, as well as imparting stiffness to the structure.

In the patent to Shook et al. U.S. Pat. No. 3,376,185, there is disclosed a contour core blanket in which blocks of end-grain balsa are attached by a polyacrylic emulsion to a nonstretchable fiber glass scrim. This blanket is readily conformable to a contoured surface, for the nature of the adhesive is such that the blocks are selectively dislodgeable from the scrim when the blocks are pressed against a contoured surface to conform thereto.

There are however several problems which arise in contour core blankets of the above type by reason of certain properties of end-grain balsa. Balsa has outstanding properties unique in the lumber field. It averages less than 9 pounds per cubic foot, which is 40 percent of the weight of the lightest North American species and its cell structure affords a combination of high rigidity and compressive and tensile strength far superior to any composite or synthetic material of equal or higher density.

It is known that end-grain balsa is capable of supporting far greater loads than flat-grain material of the same density and also that low-density material will, in the end-grain direction, support greater loads than flat-grain wood of higher density. However, in end-grain balsa blocks, the wood fibers extend longitudinally with respect to the sides of the blocks, whereby at the ends the transverse cuts of the fibers are exposed and are relatively permeable to moisture, resin or other flowable material applied thereto.

Consequently, the end-grain blocks tend to absorb moisture in the course of storage. The resultant increase in block volume cannot be accommodated by the nonstretchable scrim and the blanket therefore undergoes warping. Since the blankets may be kept in inventory for prolonged periods, this drawback is not insignificant. Moreover, the scrim which is attached to the block by a water-based acrylic adhesive may not hold, for the water from the adhesive is gradually absorbed. In time, the adhesive action may be impaired, causing the blocks to loosen from the scrim, thereby making it difficult to handle the core blanket.

Also, excessive moisture of water absorption by the balsa blocks may give rise to the following drawbacks:

A. Inhibition of cure, i.e., the polyester resin used to form the skins will not fully cure, hence the bond between the core and skins will be of poor quality.

B. Increased weight by reason of moisture content.

C. Degraded mechanical properties.

A more serious drawback of end-grain balsa in the context of contour core blankets is that, when laminating the blanket to facing skins to form sandwich panels, the resin used for such lamination tends to seep into the permeable ends of the blocks. It becomes necessary therefore to use a relatively large amount of resin to effect lamination, for much of the resin is absorbed and performs no bonding function but only contributes excessive weight to the core.

Also, with very thin facing skins, such as those formed of one or two layers of chopped fiberglass mat of the type used in panels for deck areas, the absorption of the laminating resin in the blocks may cause resin starvation in certain areas and produce printout or so-called "telegraphy" effects, whereby the edges of the blocks become visible through the skin. This effect is highly objectionable, so much so that some companies in the boat industry have discontinued the use of balsa sandwich laminates.

SUMMARY OF THE INVENTION

In view of the foregoing, it is the main object of this invention to provide a contour core blanket adapted to form a laminated structural sandwich, with markedly reduced printout, or warpage, or other drawbacks encountered in prior core blankets.

More specifically, it is an object of the invention to provide a blanket of the above type formed of end-grain blocks adhesively secured to a scrim, the exposed ends of the blocks being sealed to render them substantially nonpermeable.

Also, an object of the invention is to provide lightweight, high-strength structural sandwiches which incorporate improved contour core blankets of the above type and which are conformable to curved surfaces.

Briefly stated, these objects are accomplished in a contour core blanket in which an array of end-grain balsa blocks are adhesively supported on a flexible, nonstretchable, open-mesh scrim, the ends of each core block having a sealing film thereon to render the blocks substantially nonpermeable, the film being of a material which is compatible with the adhesive layers used to laminate facing skins to the blanket. In some instances, the edges as well as the ends of the blocks may be sealed, particularly where the blanket is incorporated in a product which is submerged in water.

BRIEF DESCRIPTION OF DRAWING

For a better understanding of the invention, as well as other objects and further features thereof, reference is made to the following detailed description to be read in conjunction with the accompanying drawing in which:

FIG. 1 is a plan view of a contour core blanket, in accordance with the invention;

FIG. 2 illustrates, in perspective, a single balsa block of the type included in the blanket;

FIG. 3 is a perspective view of a laminated structural sandwich incorporating the blanket; and FIG. 4 is a section of a structural sandwich having a curved configuration.

DESCRIPTION OF INVENTION

Referring now to the drawing and more particularly to FIG. 1, there is shown a contour core blanket in accordance with the invention, the blanket being formed by an array of blocks 10 of end-grain balsa which are adhesively secured to a scrim 11.

In practice, the blocks may be produced in the manner disclosed in the above-identified Shook et al. patent, by sawing strips of kiln-dried balsa, 2 feet long, 2 inches wide and 1 inch thick, the grain being normal to the width and length. These strips are split into 2×2 blocks which are then fed under and combined with a scrim to which adhesive has been applied. Scrim 11 preferably is formed of a flexible, nonwoven, open-mesh material of high strength, such as a fiber glass or other nonstretchable material. The dimensions given above are merely by way of example, for in practice, a broad range of sizes is used.

Because of the open mesh, the end surfaces of the blocks are almost fully exposed to facilitate subsequent lamination to a facing skin. On the other hand, the stability of the scrim maintains the blocks at their assigned positions and prevents overlapping thereof in handling. Fiber glass has the characteristic of wettability as opposed, for example, to nylon yarns which resist wetting. Hence, the fiber glass scrim may effectively be bonded by standard resins and other adhesive agents, both to the blocks and to laminating skins.

The crucial feature of the present invention resides in sealing the top and bottom ends of the balsa blocks so that they are considerably less permeable to moisture or resin and thereby resist printout effects. This is best accomplished by coating the balsa boards from which the strips are made with a polyester resin, or other sealing agent which may be applied by a roller, by spraying, or other known techniques. In practice, the sealant may be applied at any stage in the production of the blocks and to the edges of the blocks as well as to the ends thereof.

Suitable for this purpose are the following commercial types of polyester resins: Aeropol 7720 M, Aeropol 7240 MC and Berton's 58094. The sealant must be of a chemical composition compatible with the laminating adhesives later used.

The sealant which is applied forms a superficial film, just sufficient to seal up the pores of the end-grain balsa without materially increasing the weight thereof. Hence, relatively little sealant material is necessary for this purpose.

Preferably, in order to provide enhanced resistance to the absorption of moisture or resin, before the sealant is applied, the surface of the board is sanded and the resultant sawdust is powder removed from the surface but is pressed therein, e.g., by the roller applying the sealant which also acts as a binder for the sawdust particles. This has the advantage of reducing the amount of sealant necessary, for the sawdust particles serve as a coarse sealant. In place of sawdust, one may use other types of particulates or powder material, such as "Cab-O-Sil."

Thus, when the boards are thereafter cut into strips and the strips cut into blocks, each block is individually end sealed. In practice, the sealed contour core blanket is then laminated to a top facing 12 by an adhesive layer 13 and to a bottom facing 14 by an adhesive layer 15. The adhesive layers may be any material appropriate to the nature of the facing sheet, such as epoxies, vinyl phenolics or polyester resins.

The sandwich lends itself to curved forms or otherwise-shaped configurations, for the contour blanket will assume and conform to any curvature, as shown in FIG. 4. The facing sheets 16 and 17, in this instance, are curved by bending, draping, or molding techniques, depending on the nature of the facing material, the core assuming the same curvature.

In all instances, because the individual blocks are sealed, the laminating resins or adhesives are not absorbed or are only slightly absorbed in the blocks but adheres to the end surfaces thereof, thereby reducing printout effects and effecting economies in the amount of resin consumed.

While there has been shown a preferred embodiment of the invention, it is to be understood that many changes may be made therein within the scope of the underlying concept. Thus, in place of balsa blocks one may use other forms of wood or plastic material, such as blocks formed or oak or polyurethane foam. Such blocks are also subject to moisture and resin absorption and may be improved by the sealing technique disclosed herein.

Thus, in place of a scrim, one may form balsa wood cores or blankets by spraying or otherwise applying a plastic material in the liquid state over a planar array of balsa blocks, such that when the plastic cures, it forms a continuous layer thereover which adheres to the blocks. This layer, which may also be applied in the solid state, not only acts to seal the ends of the blocks, but also serves to close off the junction areas therebetween, thereby preventing seepage of resin into the blocks, as well as into the junctions when later laminating the blanket to suitable facing skins. For this purpose, both ends of the array may have the plastic layer applied thereto. The layer of plastic film or foam material also serves the function of a scrim to hold the blocks together.

Suitable for producing the layer are polyurethane or polyvinyl solutions or other plastic material of the foam or film type whose properties permit lamination to skins. The use of a plastic sealant layer also makes it possible to control the overall thickness of the core to meet particular specifications. Since, in the arrangement disclosed above, the layer has a dual function, the sealant and the scrim are one and the same. However, one may also apply the plastic spray over a scrim already attached to the blocks, in that the scrim is of open weave construction and hence admits the plastic material.

What I claim is:

1. A laminated structural sandwich comprising:
   A. a contour core blanket constituted by an array of blocks adhesively supported on a flexible scrim, said blocks being of end-grain balsa material having exposed open pores which are permeable to moisture and resins, the upper and lower ends of each block having a superficial sealant film of polyester resin thereon to close said pores to render the block substantially nonpermeable;
   B. a first facing skin laminated by an adhesive layer to the top of said core blanket, said layer being bonded to the film on the upper end of said blocks without penetrating the pores thereof, and
   C. a second facing skin laminated by an adhesive layer to the bottom of said blanket, said layer being bonded to the film on the lower end of said blocks without penetrating the pores thereof, said layers being of a material compatible with said film to effect a strong bond therebetween.

2. A sandwich as set forth in claim 1, wherein said skins are constituted by a chopped fiber glass mat.

3. A sandwich as set forth in claim 1, wherein said scrim is of a nonstretchable material.

4. A sandwich as set forth in claim 3, wherein said scrim is of fiber glass.

5. A sandwich as set forth in claim 1, wherein said sandwich has a curved profile.

6. A sandwich as set forth in claim 1, wherein said film is constituted by powder material embedded in the pores at the ends of the block held therein by a binder.